(12) United States Patent
Vyas et al.

(10) Patent No.: US 11,138,030 B2
(45) Date of Patent: *Oct. 5, 2021

(54) EXECUTING CODE REFERENCED FROM A MICROSERVICE REGISTRY

(71) Applicant: Red Hat, Inc., Raleigh, NC (US)

(72) Inventors: Jay Vyas, Concord, MA (US); Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/025,525

(22) Filed: Jul. 2, 2018

(65) Prior Publication Data
US 2018/0307524 A1   Oct. 25, 2018

Related U.S. Application Data

(63) Continuation-in-part of application No. 15/354,420, filed on Nov. 17, 2016, now Pat. No. 10,013,275.

(51) Int. Cl.
*G06F 9/455* (2018.01)
*H04L 29/08* (2006.01)
(Continued)

(52) U.S. Cl.
CPC ...... *G06F 9/45558* (2013.01); *G06F 9/45504* (2013.01); *G06F 9/45533* (2013.01);
(Continued)

(58) Field of Classification Search
CPC ............. G06F 9/45558; G06F 9/45504; G06F 9/45533; G06F 9/547; G06F 11/0766;
(Continued)

(56) References Cited

U.S. PATENT DOCUMENTS

| 7,194,543 B2 | 3/2007 | Robertson et al. |
| 8,843,939 B2 | 9/2014 | Lesandro et al. |

(Continued)

FOREIGN PATENT DOCUMENTS

WO   2016/099346 A1   6/2016

OTHER PUBLICATIONS

Krijger, Quinten, Executable Images—How to Dockerize Your Development Machine, Aug. 29, 2015 (6 pages) Link: https://www.infoq.com/articles/docker-executable-images; retrieved Oct. 26, 2016.

(Continued)

*Primary Examiner* — Tammy E Lee
(74) *Attorney, Agent, or Firm* — K&L Gates LLP

(57) ABSTRACT

Methods and systems for executing code referenced from a microservice registry are disclosed. For example, a microservice registry is stored in a memory. The microservice registry includes references to a plurality of microservices including a first microservice. An isolated guest executing on one or more processors receives a request to execute an executable code and determines that the executable code is unavailable in the first isolated guest. The isolated guest determines that, based on the microservice registry, the first microservice executes the executable code. The isolated guest forwards the first request to the first microservice and receives a result of the request from the first microservice.

20 Claims, 9 Drawing Sheets

(51) Int. Cl.
  *G06F 11/07*      (2006.01)
  *H04L 29/06*      (2006.01)
  *G06F 21/53*      (2013.01)
  *G06F 21/31*      (2013.01)
  *G06F 9/54*       (2006.01)
(52) U.S. Cl.
  CPC .......... *G06F 9/547* (2013.01); *G06F 11/0766* (2013.01); *G06F 21/31* (2013.01); *G06F 21/53* (2013.01); *H04L 63/0272* (2013.01); *H04L 67/1012* (2013.01); *H04L 67/2814* (2013.01); *G06F 2009/45587* (2013.01); *G06F 2009/45595* (2013.01); *H04L 63/02* (2013.01)
(58) Field of Classification Search
  CPC ..... G06F 21/31; G06F 21/53; H04L 63/0272; H04L 67/1012; H04L 67/2814
  See application file for complete search history.

(56) References Cited

U.S. PATENT DOCUMENTS

| | | | |
|---|---|---|---|
| 9,363,301 B2 | 6/2016 | Lawson et al. | |
| 9,369,406 B2 | 6/2016 | Thomas et al. | |
| 9,467,476 B1 | 10/2016 | Shieh et al. | |
| 2006/0168156 A1 | 7/2006 | Bae et al. | |
| 2010/0299437 A1 | 11/2010 | Moore | |
| 2010/0306599 A1* | 12/2010 | Cota-Robles | G06F 11/0784 714/48 |
| 2016/0127454 A1 | 5/2016 | Maheshwari et al. | |
| 2016/0269425 A1 | 9/2016 | Shieh et al. | |
| 2017/0046146 A1 | 2/2017 | Jamjoom et al. | |
| 2019/0043231 A1* | 2/2019 | Uzgin | G06T 11/60 |
| 2019/0188015 A1* | 6/2019 | Sukhyani | G06F 21/53 |
| 2019/0294519 A1* | 9/2019 | Garg | G06F 11/3428 |
| 2019/0320038 A1* | 10/2019 | Walsh | H04L 41/5051 |

OTHER PUBLICATIONS

Namit, Enterprise Application Platform with Microservices—A Service Fabric Perspective, Jun. 21, 2016 (4 pages) Link: https://blog.kloud.com.au/2016/06/21/enterprise-application-platform-with-microservices-a-service-fabric-perspective/; retrieved Oct. 26, 2016.
Bryant, Daniel, Docker and High Security Microservices: A Summary of Aaron Grattafiori's DockerCon 2016 Talk, Aug. 14, 2016 (5 pages) Link: https://www.infoq.com/news/2016/08/secure-docker-microservices; retrieved Oct. 26, 2016.
Super Small Docker Image Based on Alpine Linux (11 pages) Link: https://news.ycombinator.com/item?id=10782897; retrieved Oct. 26, 2016.
Clink: containerize all the things (3 pages) Link: https://github.com/soulshake/clink; retrieved Nov. 15, 2016.

* cited by examiner

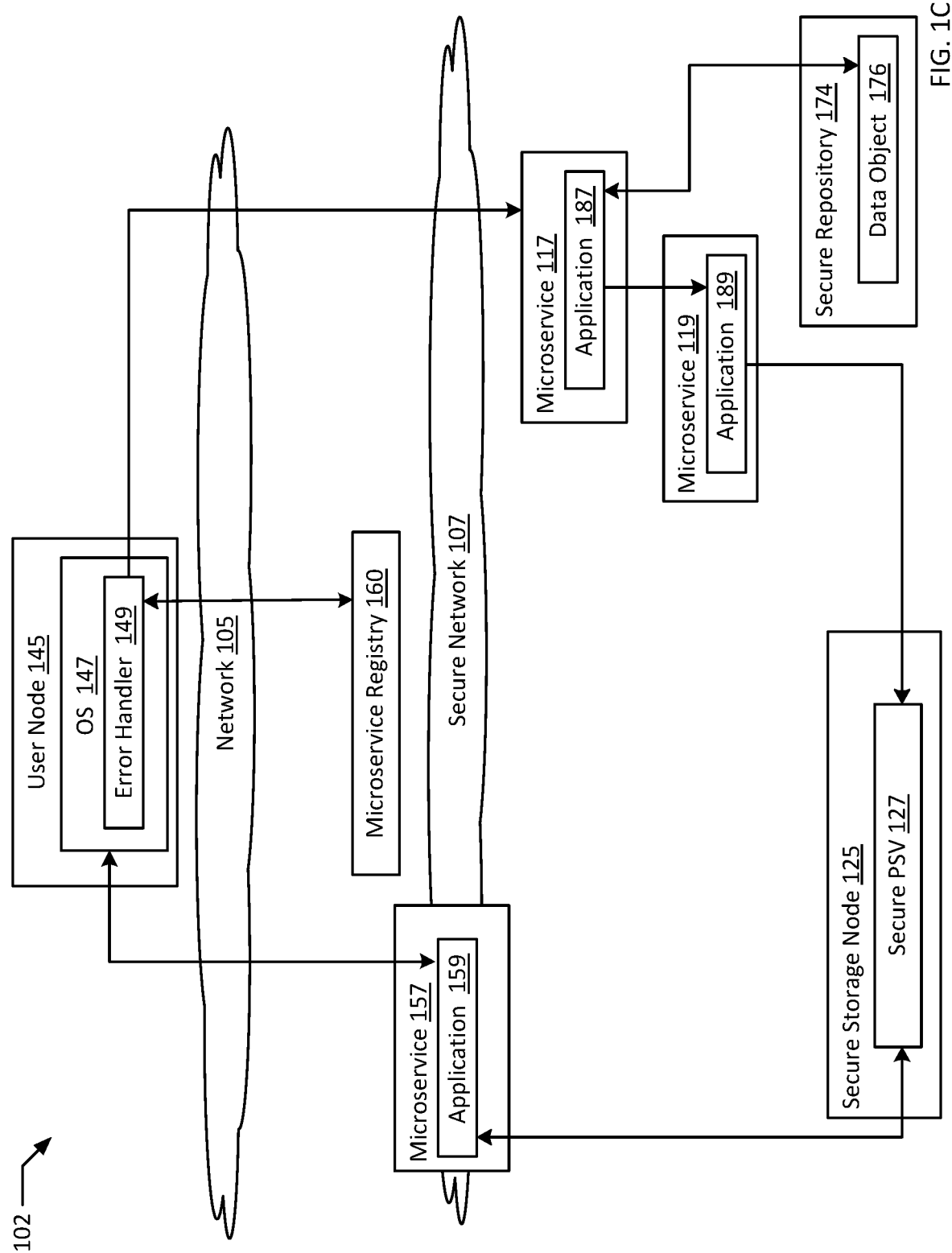

EXECUTING CODE REFERENCED FROM A MICROSERVICE REGISTRY

PRIORITY CLAIM AND CROSS-REFERENCE TO RELATED APPLICATIONS

The present application is a continuation-in-part of and claims priority to U.S. patent application Ser. No. 15/354,420, filed on Nov. 17, 2016, the entire contents of which are incorporated by reference herein.

BACKGROUND

The present disclosure generally relates to improving the execution of isolated guests deployed in a network environment. In computer systems, it may be advantageous to scale application deployments by using isolated guests such as virtual machines that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to create very lean isolated guests, designed to include only components necessary to achieve the function for which these isolated guests are designed. Many isolated guests are built from image files, and the image files tend to be designed to be lean to decrease the latency required to launch an isolated guest. Therefore, careful consideration is typically taken by a developer to decide what components (e.g., code blocks, utilities, programs, applications, features, or configurations) may be removed from an isolated guest image while still keeping the isolated guest functional and fit for purpose.

SUMMARY

The present disclosure provides a new and innovative system, methods and apparatus for executing code referenced from a microservice registry. In an example, a microservice registry is stored in a memory. The microservice registry includes references to a plurality of microservices including a first microservice. An isolated guest executing on one or more processors receives a request to execute an executable code and determines that the executable code is unavailable in the first isolated guest. The isolated guest determines that, based on the microservice registry, the first microservice executes the executable code. The isolated guest forwards the first request to the first microservice and receives a result of the request from the first microservice.

In an example, an operating system with an error handler executes on one or more processors to receive a request to execute an executable code. The error handler queries a microservice registry associated with a plurality of microservices for a microservice of the plurality of microservices to handle the request. The error handler forwards the request to the microservice, and the operating system outputs a report indicating a success confirmation associated with the first request.

Additional features and advantages of the disclosed method and apparatus are described in, and will be apparent from, the following Detailed Description and the Figures.

BRIEF DESCRIPTION OF THE FIGURES

FIGS. 1A-C are block diagrams of a virtual machine system executing code referenced from a microservice registry according to an example of the present disclosure.

DETAILED DESCRIPTION OF EXAMPLE EMBODIMENTS

Figure 1A:
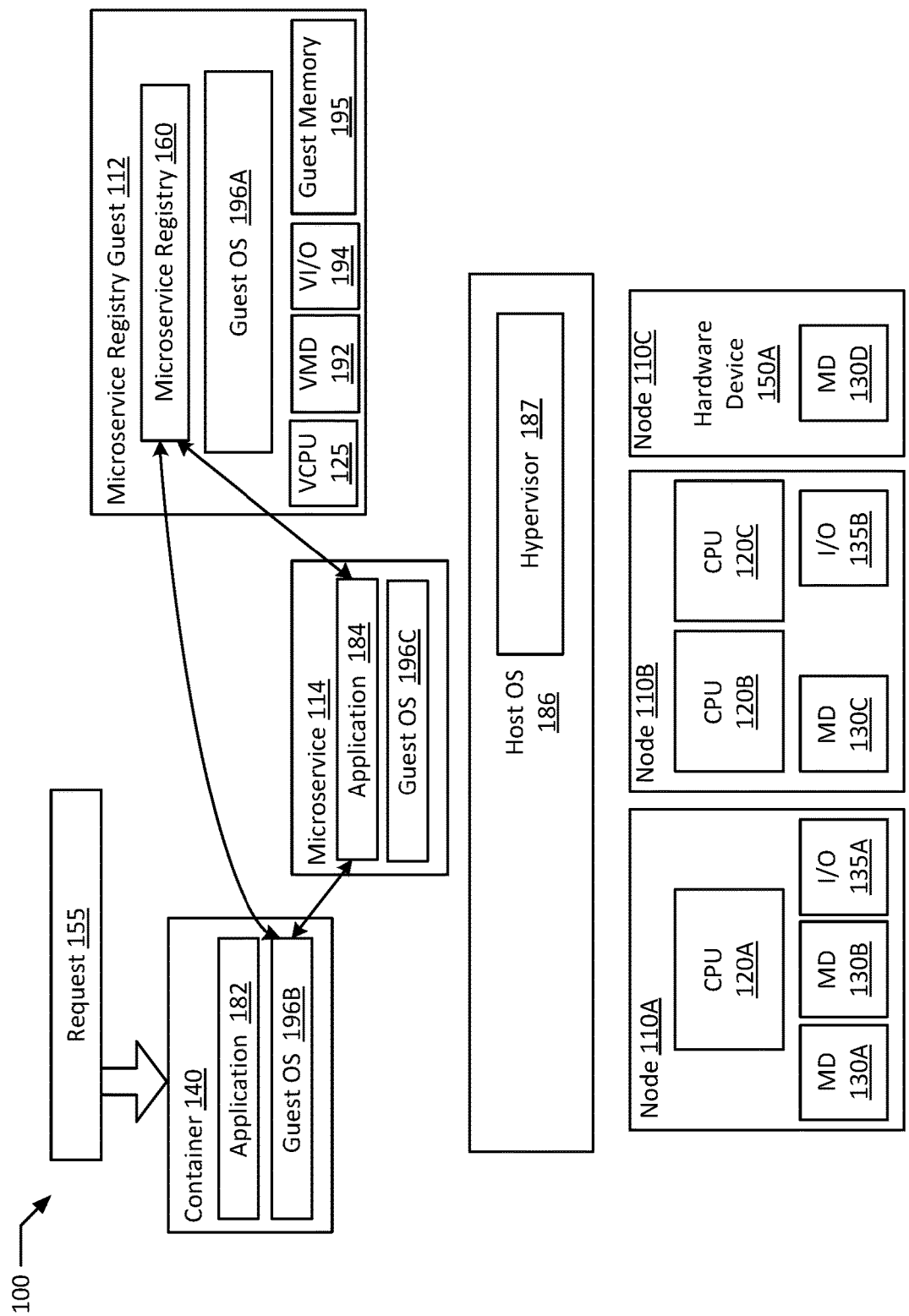

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, container based virtualization system such as Red Hat® OpenShift® and/or Docker® may be advantageous as container based virtualization systems may be lighter weight than systems using virtual machines with hypervisors. Isolated guests tend to be constructed from image files, the image files typically composed of individual layers of components. An isolated guest may be constructed with intent to minimize the number of layers and the size of the isolated guest to speed up loading time and deployment of the isolated guest. As a result, such isolated guests may lack some of the functionality generally associated with a general purpose computer, for example, the capability to view a website, install a new program to the isolated guest, or to edit certain types of files.

In a small scale environment such as a testing environment, deficiencies in the capabilities of a certain isolated guest may be overcome with certain utilities. For example, a program called clink is a wrapper available for Docker® in systems utilizing Docker® containers that allows a container to launch another Docker® container to execute code that is not installed or available on the first container. Implementing a clink-style solution outside of testing may be problematic, however, because in order for a container to be able to launch another container, the container generally requires elevated rights in the container's host operating system, leaving open a potential security risk for malicious actors to exploit. In an example, a malicious actor may gain access to a container with elevated rights and run malicious code of their choosing in other containers or other parts of the system. A malicious actor may also attempt to reroute a request into an image file that has been tampered with resulting in a compromised container being launched, without having first gained sufficient access to launch the container independently. Additionally, in an optimization scenario, factoring in the lifecycle costs of another container greatly erodes the efficiency gains from the containerization of the first application, possibly defeating the purpose of using the container in a production environment for compute efficiency altogether.

The present disclosure aims to address handling atypical requests to execute code from isolated guests through the use of microservices and a microservice registry. In an example, a microservice may be a flexible, independently deployable software system, designed to be lightweight and granular. A microservice may be designed to be responsible for a particular well defined task in a system or network of systems. In an example, a microservice registry may include references to the microservices available in a network environment, including the capabilities, and the expected inputs and outputs of each of the microservices in the microservice registry. In an example, there are microservices referenced to by the microservice registry in the environment that are deployed for the purpose of handling many commonly executed pieces of code, such as binary executables files, scripts and programs that may not be packaged into isolated guests like containers and/or VMs launched in the environment. In an example, an executable component may be added to the operating system of a container, for example in the/bin/directory that may interface with a microservice registry and microservices. For the relatively low cost of maintaining fairly static microservices and the microservice registry, these microservices may be available to cover the unforeseen, one-off scenarios where a container may need to execute code that is not built into the container. In an example, a cloud services provider may also host many commonly used executables, such as binary executable files, scripts and programs as a centralized service provided to users and tenants of the network.

Figure 1B:
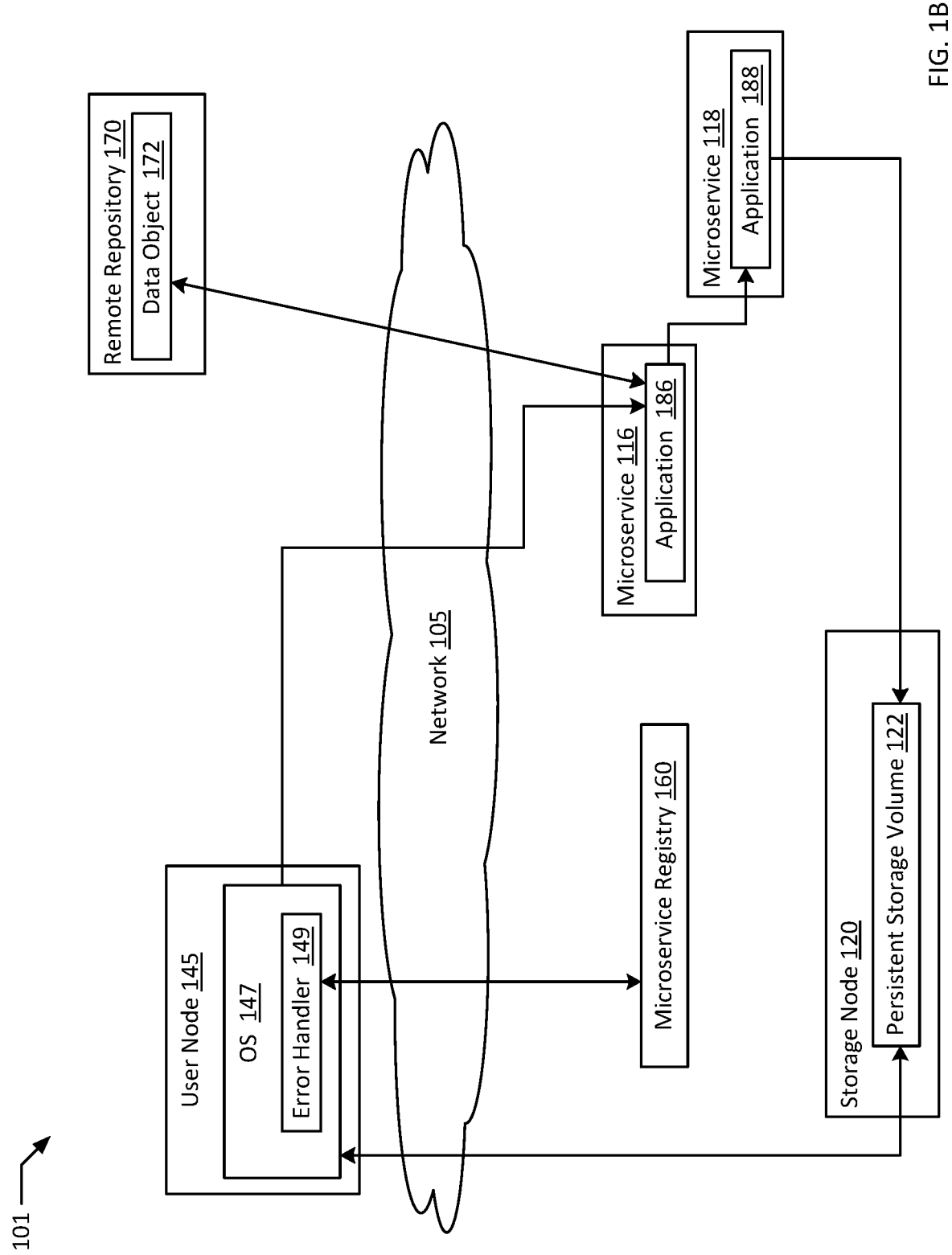

FIGS. 1A-C are block diagrams of a virtual machine system executing code referenced from a microservice registry according to an example of the present disclosure. The system 100 illustrated in FIG. 1A may include one or more interconnected nodes 110A-C. Each node 110A-B may in turn include one or more physical processors (e.g., CPU 120A-C) communicatively coupled to memory devices (e.g., MD 130A-D) and input/output devices (e.g., I/O 135A-B). Node 110C may include a hardware device (e.g., hardware device 150A) and a memory device 130D. In an example, a hardware device (e.g., 150A) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, graphics cards etc.

As used herein, physical processor or processors 120A-C refers to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, persistent memory, or any other device capable of storing data. As discussed herein, I/O device 135A-B refers to a device capable of providing an interface between one or more processor pins and an external device, the operation of which is based on the processor inputting and/or outputting binary data (e.g., network interfaces, storage controllers, graphics cards, etc.).

Processors 120A-C may be interconnected using a variety of techniques, ranging from a point-to-point processor interconnect, to a system area network, such as an Ethernet-based network. Local connections within each node 110A-C, including the connections between a processor 120A and a memory device 130A-B and between a processor 120A and an I/O device 135A may be provided by one or more local buses of suitable architecture, for example, peripheral component interconnect (PCI).

In an example, system 100 may run one or more isolated guests, for example, microservice registry guest 112, microservice 114, and container 140 may all be isolated guests. In an example, container 140 may be a container using any form of operating system level virtualization, for example, Red Hat® OpenShift®, Docker® containers, chroot, Linux®-VServer, Solaris® Containers (Zones), FreeBSD® Jails, HP-UX® Containers (SRP), VMware ThinApp®, etc. Containers may also run directly on host operating system 186 or run within another layer of virtualization, for example, in a virtual machine. Microservice registry guest 112 may be a virtual machine, executing on a software layer (e.g., a hypervisor 187) above the hardware and below the isolated guests. In an example, a hypervisor 187 may be a component of the host operating system 186 executed by the system 100. In another example, the hypervisor 187 may be provided by an application running on the operating system 186, or may run directly on the system 100 without an operating system beneath it. The hypervisor 187 may virtualize the physical layer, including processors, memory, and I/O devices, and present this virtualization to the microservice registry guest 112 as devices, including virtual processor 125, virtual memory device 192, and/or virtual I/O devices 194. Virtual machines may utilize any virtualization technology, including but not limited to Red Hat® Virtualization Manager™ Linux®-VServer™, Windows® Virtual PC™, various virtualization solutions available from ORACLE® CORPORATION and VMware®, etc. In an example, microservice registry guest 112, microservice 114, and container 140 may be some of many possible containers and or virtual machines constructed and stored within nodes 110A-C. In an example, microservice 114 may be a container, a virtual machine, another form of isolated guest, or an application in a host OS (e.g., host OS 186). In another example, the functions performed by microservice registry guest 112 may be performed by a container or physical host instead of a VM. In another example, the functions performed by container 140 may be performed by a VM or a physical host instead of a container.

In an example, a microservice registry guest 112 may be a VM executing a guest operating system 196A which may utilize the underlying VCPU 125, VIVID 192, and VI/O devices 194. One or more applications including a microservice registry 160 may be running on microservice registry guest 112 under the respective guest operating system 196A. Processor virtualization may be implemented by a hypervisor 187 scheduling time slots on one or more physical processors 120A-C such that from the guest operating system's perspective those time slots are scheduled on a virtual processor 125.

A microservice registry guest 112 may run on any type of dependent, independent, compatible, and/or incompatible applications on the underlying hardware and OS 186. In an example, an application (e.g., microservice registry 160) running on a microservice registry guest 112 may be dependent on the underlying hardware and/or OS 186. In another example, microservice registry 160 running on a microservice registry guest 112 may be independent of the underlying hardware and/or OS 186. Additionally, microservice registry 160 running on microservice registry guest 112 may be compatible with the underlying hardware and/or OS 186. In an example, microservice registry 160 running on a microservice registry guest 112 may be incompatible with the underlying hardware and/or OS. In an example, a device may be implemented as a microservice registry guest 112. A hypervisor 187 may manage memory for the host operating system 186 as well as memory allocated to the microservice registry guest 112 and guest operating system 196A such as guest memory 195A provided to guest OS 196.

In some examples, the microservice registry 160 may include or be associated with any suitable type of database, for example, a relational database. The microservice registry 160 may be associated with a database management system (DBMS). A DBMS is a software application that facilitates interaction between the database and other components of the nodes 110A-C. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the microservice registry 160 may be organized as a formal database with a schema such as a relational schema with defined tables, indices, links, triggers, various commands etc. In some examples, the storage component of microservice registry 160 may not be organized as a formal database, but may instead be an alternative storage structure capable of holding the information and being queried in relation to the status of microservices in system 100, including but not limited to a file, folder, directory, registry, etc. In some examples, the microservice registry 160 may reside over a network (not depicted), which may be, for example, a public network (e.g., the Internet), a private network (e.g., a local area network (LAN) or wide area network (WAN)), or a combination thereof.

In an example, each of microservice registry guest 112, microservice 114 and container 140 may be combined in one isolated guest or more isolated guests, or a physical host node may perform the functions of any one of microservice registry guest 112, microservice 114 and container 140. In an example, container 140 may be a container designed to execute application 182 on top of guest operating system 196B. Container 140 may receive a request 155 to execute code that is unavailable (e.g., not installed) on container 140. In an example, microservice registry guest 112 may be a virtual machine hosting a microservice registry (e.g., microservice registry 160). Microservice 114 may be an isolated guest, such as a container or virtual machine, whose designed purpose is to host and execute application 184 on guest operating system 196C.

Remote execution of code through a microservice registry may additionally be implemented to provide for functionality unavailable on end-user computing nodes (e.g., desktop computers, laptop computers, tablets, smartphones, etc.), for example, due to security restrictions on the devices and/or on the data the applications are being executed to modify. For example, due to privacy concerns, certain personal identifying information and/or financial data may not be transferred and saved to a mobile end user device (e.g., laptop, tablet, smartphone, etc.). A microservice may therefore be employed to manipulate a server side copy of this sensitive data, with an error handler on the user node implemented to redirect and handle such data manipulation requests as if the functionality to modify the data was available on the end user device itself. In an example, executing code referenced from a microservice registry also enables efficient deployment of thin user client devices with limited onboard functionality that is readily extensible through microservices and server-side compute processes. This enables commoditized hardware to be deployed to users, for example, in an enterprise environment, while allowing that commoditized hardware to serve the needs of a majority of users in the enterprise by extending the functionality of that hardware through microservices. Sensitive data may also be better controlled, for example, by processing data stored in secured network storage, while only allowing change controlled, transient copies of the data to be viewed on an endpoint terminal device by users. Network and data security are therefore enhanced while reducing under utilized, inefficient computing resources deployed to end user devices via over-provisioned hardware.

Illustrated system 101 in FIG. 1B is an extension of system 100, where in addition to providing microservice code execution to guests and physical servers in a hosted cloud environment, microservice registry 160 is also accessible to end user devices. In an example, network 105 may be any form of suitable network for allowing communications between computing devices, for example, a public network (e.g., the Internet), a private network (e.g., a local area network (LAN) or wide area network (WAN)), or a combination thereof. In an example, user node 145 may be any form of network accessible device (e.g., phone, tablet, laptop, desktop, server, Internet of Things ("IOT") device, etc.). In the example, OS 147 is an operating system of user node 145 (e.g., Red Hat® Enterprise Linux®). In the example, an account associated with user node 145 may authenticate with a network gateway to connect to microservice registry 160, and/or microservices 116 and 118. In an example, microservices 116 and 118 are similar to microservice 114 (e.g., guests providing execution platforms for executable code). For example, microservice 116 hosts application 186 (e.g., a network file retrieval utility), while microservice 118 hosts application 188 (e.g., a data manipulation utility). In an example, an application may be hosted across multiple microservices, each responsible for certain functionalities associated with the application. In an example, an application as described herein may be any form of executable code, including operating system components, utilities, programming tools, etc.

In an example, OS 147 includes an error handler 149 to handle unrecognized commands input into OS 147. For example, the error handler may be implemented by leveraging the "command_not_found_handle" shell hook in Linux® implementations. For example, if a request to execute application 186 is received on OS 147 to retrieve a file from a source across a network (e.g., via secure shell, telnet, cURL, etc.), and the appropriate executable code is determined by OS 147 as being unavailable on user node 145, an error may be generated. For example, an exception indicating that application 186 is not installed on OS 147. In some examples, an error may also be generated based on the requested usage of application 186 being not permitted by a current user account of application 186. In the example, the error generated would by default generate an error message displayed to the user of user node 145 indicating "command not found" to signal, for example, that the command may have been input incorrectly. This error may also be trapped by OS 147 by invoking the "command_not_found_handle" shell hook, which would then allow the error to be handled by a separate error handler program (e.g., error handler 149), which may take the input command and query microservice registry 160 for an appropriate microservice with which to execute application 186. In an example, an error may be any trigger for processing outside of the ordinary course of execution for a program, and therefore instead of being an indicator that execution has gone wrong, an error may be an expected result of a command that leads to predictable behavior via an error handling process. For example, by default, OS 147 may be configured to locate executable code by checking directories associated with a $PATH variable associated with OS 147. An error may be generated if the executable code is not located in any directory associated with the $PATH variable. However, that error being trapped and further processed by error handler 149 may be predictable behavior. In the example, the error may only be finally brought to a user's attention if error handler 149 is unable to process the request and thereby override the error. For example, if microservice registry 160 is also unable to facilitate execution of the request (e.g., where no microservice referenced by microservice registry 160 being capable of executing the request), microservice registry 160 may respond to error handler 149 with a negative response, which may be translated by error handler 149 into an error message that is brought to a user's attention and/or recorded in a log file. In an example, error handler 149 may be implemented as part of a cascade of components in OS 147 that receives a given command and/or request to attempt to execute the command and/or request before a user of user node 145 is notified that the request is unfulfillable. In an example, an error may be logged and recorded even if it is handled and overridden by error handler 149.

In an example, storage node 120 may be any form of network accessible storage providing persistent storage accessible to user node 145 over network 105, for example, dedicated storage hardware (e.g., Network Attached Storage ("NAS"), Storage Area Networks ("SAN"), etc.), and/or distributed storage networks (e.g., implemented with distributed file systems such as GlusterFS®). With a distributed file system, virtual storage volumes may be configured from a pool of storage space networked together over a networking protocol such as transmission control protocol/internet protocol ("TCP/IP"), enabling the creation of massive storage arrays (e.g., in the petabyte range) from excess capacity on commoditized hardware. In an example, persistent storage volume 122 is a virtual storage volume requested for and exposed and/or mapped to OS 147 (e.g., via a persistent volume claim).

In an example, OS 147 receives a command to retrieve data object 172 (e.g., a file containing manipulable data) from a remote repository 170 (e.g., any host connected to network 105). In the example, remote repository 170 may be configured to allow retrieval of data object 172 after the establishing of a secure session with authentication credentials, where network 105 is a public network (e.g., the internet). In the example, OS 147 receives a request to retrieve data object 172 over secure shell with authentication credentials given as part of the request, and then to create a PDF report with the retrieved data. In the example, the secure shell program is not installed on OS 147, and neither is the reporting application. Error handler 149 intercepts an error generated by OS 147 based on the unavailability of the secure shell program and the reporting application, and queries microservice registry 160 for microservices executing these two applications. In the example, microservice 116 is identified as executing the secure shell program (e.g., application 186), and microservice 118 is identified as executing the reporting application (e.g., application 188). The request is sent to microservice 116 for data object 172 to be retrieved with the credentials included with the request. In an example, the request may be validated as being authorized for the user of user node 145 by OS 147, microservice registry 160, and/or microservice 116. In an example, retrieved data object 172 is returned to OS 147, after which a second error may be generated for failing to locate the reporting application, which results in error handler 149 obtaining connection information to microservice 118 for processing data object 172. In another example, the full command or request may be evaluated by error handler 149 and multiple microservices may be prequeued to execute the entire request before results are returned to OS 147. In an example, error handler 149 may query microservice 160 for each application in a chain of processes performed as parts of one request. In an example, even if OS 147 is capable of performing an intermediary step of a chained request, error handler 149 may nevertheless select a microservice to perform such a step, for example, to reduce overall request latency where different microservices are located locally to each other, while user node 145 is across a noticeable networking gap from the microservices, which would add significant latency.

In the various examples, microservice 118 recieves data object 172 (e.g., directly from microservice 116, or from OS 147 and error handler 149) and generates the requested PDF report with application 188. In an example, rather than directly returning the results (e.g., the report) to user node 145, the report is saved to a persistent storage volume 122 accessible to user node 145. For example, the report may be a large file that would take up a disproportionate amount of the onboard memory capacity of user node 145. In another example, the original request may have specified a storage location for the resulting report, for example, on a network drive (e.g., persistent storage volume 122) mounted to user node 145. In an example, persistent storage volume 122 may be created in response to a request to store the resulting report, and may be mapped to OS 147 as part of the execution of the request. After the report is available on persistent storage volume 122, OS 147 may generate a success confirmation (e.g., a link to the resulting file) and present the confirmation to the user of user node 145 (e.g., via a display terminal).

Illustrated system 102 in FIG. 1C is a similar system to system 101 in FIG. 1B, further addressing data security associated with results from processing done by microservices 116 and 118. In an example, a second request to process a separate data file for reporting is received by OS 147, this time the data file is located on a secure repository 174 across a secure network 107. For example, the second request may require a data object 176 that includes personal identifying information. In an example, secure network 107 may be a similar network to network 105, however, devices within secure network 107 may be isolated from public networks (e.g., the Internet), by a layer of devices operating as a firewall. In an example, a layer of devices (e.g., routers, switches, servers) constituting a "de-militarized zone" ("DMZ") may isolate secure network 107 from directly interfacing with network 105. In an example, the personal identifying information on data object 176 is restricted from being retrieved to outside of secure network 107. In an example, OS 147 has an application installed capable of executing the data retrieval request for data object 176, but the execution of the request is denied based on network access permissions for secure network 107 resulting in an error executing the request. In another example, an error is generated due to OS 147 not having the proper executable code to use to retrieve data object 176 installed. In either example, error handler 149 may trap and handle the resulting error by querying microservice registry 160 for a proper microservice to execute the request. In an example, microservice registry 160 is located outside of secure network 107 but may be configured to include references to secure microservices inside secure network 107. In an example, accessing systems within secure network 107 (e.g., microservices 117, 119, secure repository 174, secure storage node 125, etc.) requires special authentication through a gateway node of secure network 107. In an example, microservice 117 is identified as a microservice located inside of the secure network 107 executing application 187 capable of retrieving data object 176 for further processing.

In an example, the request is forwarded through a secure gateway of 107 to microservice 117, which retrieves data object 176 with application 187. In the example, microservice 117 is configured not to send secure data back to an unsecured user node, and therefore microservice 117 identifies microservice 119 as a microservice inside the secured zone that can process data object 176 into desired form (e.g., a report). In the example, application 189 receives data object 176 and processes data object 176 into a report. While processing the data object 176, microservice 117 may identify and/or request a secure persistent storage volume 127 on secure storage node 125 for storing the resulting report. In an example, microservice 117 requests the provisioning of secure persistent storage volume 127. In another example, secure persistent storage volume may be preidentified as part of the request forwarded by error handler 149. In an example, microservice 157 and application 159 may be implemented as part of a secure gateway of secure network 107, accessible to both systems inside of secure network 107 as well as those outside of secure network 107, for example with different network interfaces and network addresses associated with connections inside and outside of secure network 107. In the example, application 159 may be an application that renders data in secure storage node 125 for viewing by user nodes outside of secure network 107 (e.g., user node 145) while preventing user nodes from saving local copies of the data to ensure data security. For example, while connected to application 159, saving features and features such as taking screen shots may be disabled on user node 145. In the example, user node 145 may access the report generated by application 189 through application 159.

Figure 2:
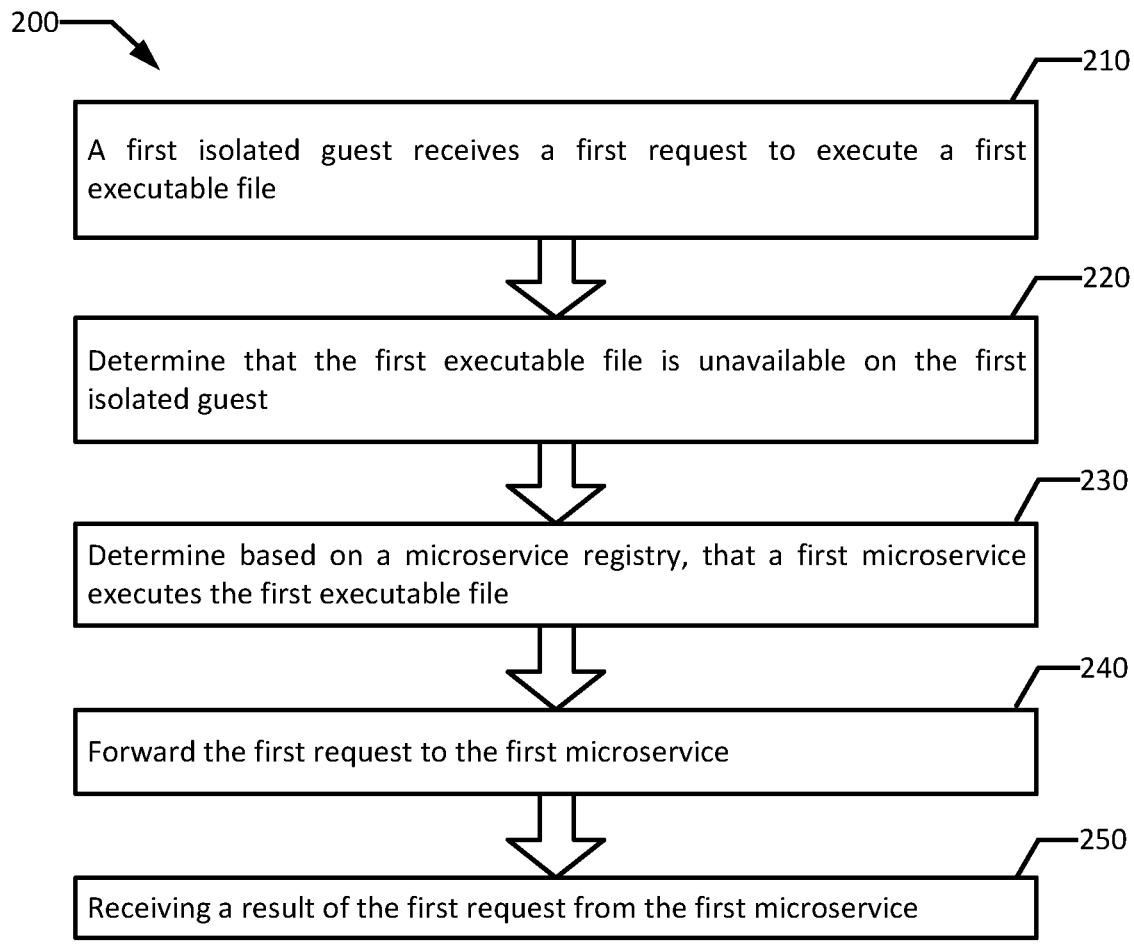
FIG. 2 is a flowchart illustrating an example of executing code referenced from a microservice registry according to an example of the present disclosure.

FIG. 2 is a flowchart illustrating an example of executing code referenced from a microservice registry according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method is performed by an isolated guest such as a container 140.

A first isolated guest receives a first request to execute a first executable code (block 210). In an example, container 140 may receive a request 155 to execute application 184. In an example, application 184 may be a binary executable file, a script, a program, or any other executable computational entity capable of returning a result from a given input. In an example, a user logged into container 140 may decide to execute cURL to pull data from a website. A user may also decide to execute a binary executable like git to access a source code repository. In another example, application 182 executing on container 140 may run into a rarely executed portion of application 182's logic requiring output from application 184. In an example, a programmer constructed an image file from which container 140 was built without adding application 184 to the image file.

It is determined that the first executable code is unavailable on the first isolated guest (block 220). In an example, the guest operating system 196B may discover that application 184 is unavailable on container 140. In an example, container 140 and/or the guest operating system 196B may be configured to produce an error when an executable code that is unavailable is requested. In an example, a user, upon seeing an error indicating that a requested application is unavailable (e.g., cURL or git), the user may attempt to execute an installer (e.g., yum) to install cURL and/or git, and may discover that the installer is also unavailable on container 140. In an example, the user may choose to use microservice registry 160 to handle the request. In an example, a user may be testing dependencies for an application to be deployed to a new container, and may choose to install the missing executable code to the container or add the missing executable code to an image file used to construct the container rather than executing the executable code with a microservice.

The first isolated guest may determine, based on a microservice registry, that a first microservice executes the first executable code (block 230). In an example, upon determining that application 184 is unavailable on container 140, at least one of the container 140 and the guest operating system 196B may query a microservice registry 160 to determine if there is an accessible microservice that may execute application 184. In an example, container 140 may receive a response to its query to microservice registry 160 indicating that microservice 114 executes application 184. In an example implementation, the guest operating system 196B may include a wildcard executable that executes against microservice registry 160, capable of capturing any requests for executing code that are not available in container 140 and sending the name of the executable code in a query to microservice registry 160. In an example, microservice registry 160 may be located over a network from container 140. In an example, microservice registry 160 may include references to a second microservice that executes application 184.

The first isolated guest forwards the first request to the first microservice (block 240). In an example, the container 140 may forward the request 155 to microservice 114, including any data associated with the request 155. In an example, data associated with request 155 is compressed and/or encrypted before transfer. In an example, microservice 114 may be another isolated guest, for example a container or a virtual machine, and/or may be located over a network from container 140. In an example, container 140, guest operating system 196B and/or a user may select microservice 114 over another microservice executing application 184 based on factors including a comparison of the version of application 184 executing on microservice 114 versus on the second microservice, a comparison of the current response time between the two microservices, a comparison of the location of the two microservices, and/or user preference. A user request to execute cURL on container 140 may include additional arguments, such as the URL of a website to retrieve, and a location to store the downloaded data, these arguments may be passed on to microservice 114. A user request to execute git may include a directory to be uploaded or downloaded from a source code repository, and may be compressed and/or encrypted before being passed to the microservice executing git, for example, to reduce size and network latency and/or increase security.

The first isolated guest receives a result of the first request from the first microservice (block 250). In an example, container 140 may receive the output of executing application 184 from microservice 114, and may display the result to a user who may be a requester of the execution of application 184. In an example, the request to execute application 184 may be an intermediary step, and the container 140 may use the result of the execution of application 184 in a second request, for example, for container 140 to execute application 182. A user requesting to execute cURL may receive the contents of the website requested in a file from a microservice executing cURL. For example, a request to retrieve the html code used to generate the website may result in an html file in a specified directory. A request may also be made to load content from a website using cURL to be processed by an application executing on container 140. For example, a retrieved html file may be an input for a program to search for keywords in an input file (e.g., a file created from the output of the cURL program). A user requesting to execute git may receive confirmation that their files have been stored to a source code repository or receive files retrieved from the source code repository. For example, the user may retrieve a directory from the source code repository to an indicated location or in the form of a compressed file containing the files and directories requested.

In an example, a second request may be received by container 140, to execute a different application that is also unavailable on container 140. In an example, the container 140 may determine, for example through the use of microservice registry 160, that microservice 114 and a different, second isolated guest execute the second unavailable application. In an example, the container 140 forwards the second request to either the microservice 114 or the second isolated guest that executes the second unavailable application and receives the results of the request. In the example, the second isolated guest that executes the second unavailable application may be hosted on the same hardware as container 140 (e.g., nodes 110A-C) or on different hardware, for example, across a network from container 140. In another example, the container 140 may determine that a node of nodes 110A-C or host operating system 186 executes the second unavailable application, and forwards the request to nodes 110A-C or host operating system 186, and then receives the results of the second request.

Figure 3:
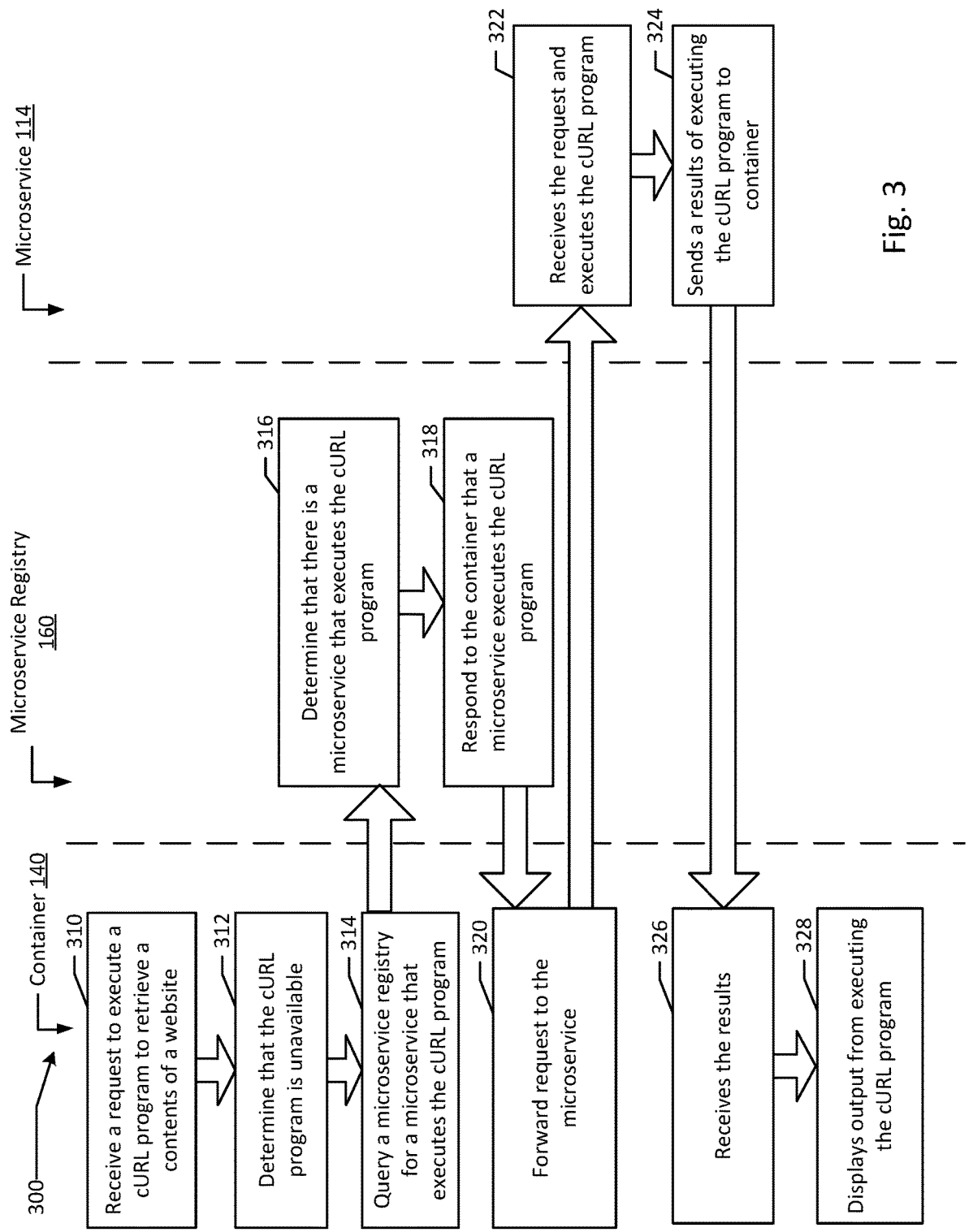
FIG. 3 is a flow diagram illustrating an example system executing code referenced from a microservice registry according to an example of the present disclosure.

FIG. 3 is a flow diagram illustrating an example system executing code referenced from a microservice registry according to an example of the present disclosure. Although the examples below are described with reference to the flowchart illustrated in FIG. 3, it will be appreciated that many other methods of performing the acts associated with FIG. 3 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 300, the isolated guest is a container 140 querying microservice registry 160 and utilizing microservice 114 to execute a request.

In an example, container 140 receives a request to execute the cURL program to retrieve the contents of a web site (block 310). In an example, the request may be to execute any program, script or code on the container, either from a user or from another program. In an example, the container 140 determines that the cURL program is unavailable (block 312). In the example, the cURL program may be unavailable for any reason. For example, the cURL program may never have been installed in the container 140. In another example, the determination that the program is unavailable, and any of the other actions performed by the container 140, may be made by any component of the container 140. For example, the guest operating system 196B may include a component such as a binary executable file that may catch requests for unavailable executable code to be forwarded to a microservice registry guest 112. In an example, the container 140 queries a microservice registry for a microservice that executes the cURL program (block 314). For example, microservice registry 160 may receive the query for a microservice that executes the cURL program.

The microservice registry 160 determines that there is a microservice that executes the cURL program (block 316). In an example, the microservice registry 160 may query a database associated with the microservice registry 160 for a microservice that executes the cURL program, and may successfully identify that a microservice 114 executes the cURL program. In an example, the microservice registry 160 responds to the container 140, informing container 140 that microservice 114 executes the cURL program (block 318).

In an example, after receiving the response from microservice registry 160, container 140 may forward the request to execute the cURL program to microservice 114 (block 320). In a further example, any associated information necessary for the request such as a URL of the website to be retrieved may also be forwarded to microservice 114. In an example, container 140 may forward its stdin standard stream to microservice 114 such that the cURL program executing on microservice 114 may process the request as if the request originated in microservice 114. In an example, microservice 114 receives the request and executes the cURL program (block 322). In an example, the microservice 114 successfully executes the cURL program to receive the contents of the website at the URL provided. In an example, the microservice 114 sends the results of executing the cURL program back to container 140 (block 324). In an example, container 140 receives the results (block 326). In some examples, container 140 may receive the results, for example, in its stdout standard stream as if container 140 executed the cURL application. In an example, the container 140 may notify a user. In an example, the container 140 may write a notification to a log file or display a message on the screen, that the cURL application was not executed by container 140. In an example, the container 140 may log that microservice 114 executed the cURL application. In an example, the container 140 may display the output from executing the cURL program (block 328). For example, the results from the user's request to execute the cURL program may be displayed via stdout on the screen of the user or wherever the user has forwarded the contents of stdout. Accordingly, for example, the user may be unaware that microservice 114 played a part in the user's request to execute the cURL application.

Figure 4:
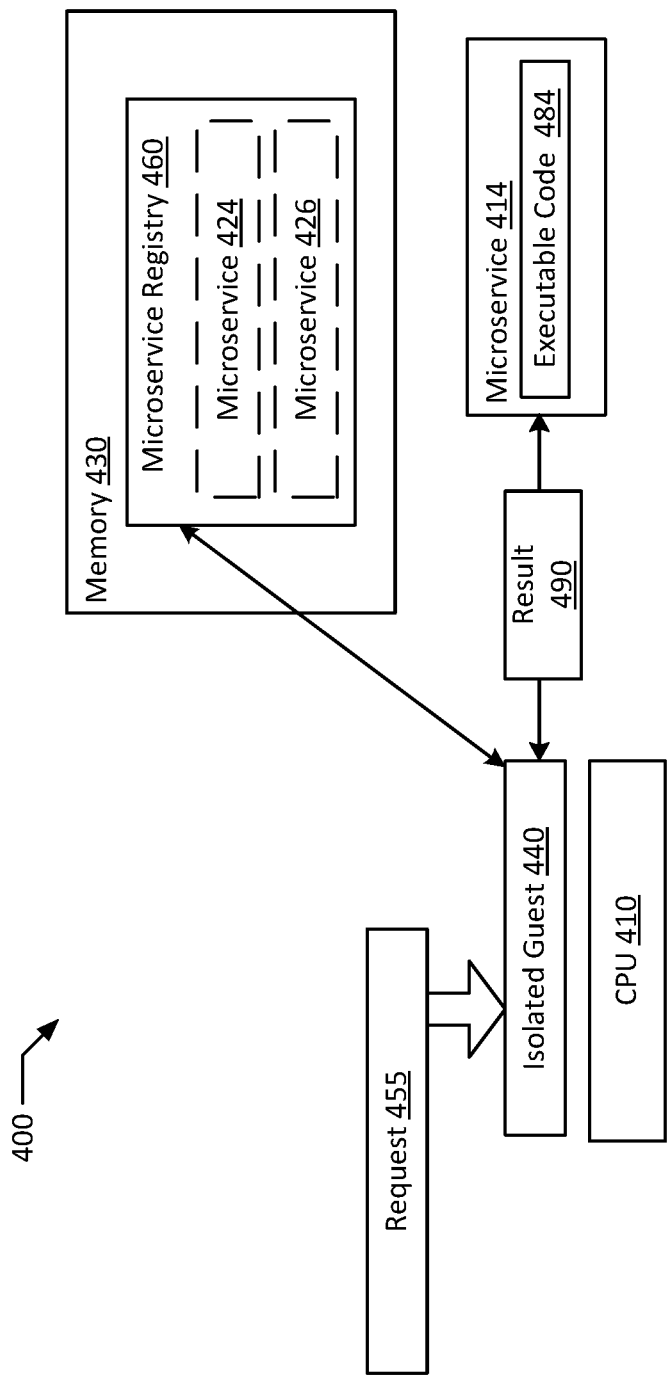
FIG. 4 is a block diagram of an example system executing code referenced from a microservice registry according to an example of the present disclosure.

FIG. 4 is a block diagram of an example system executing code referenced from a microservice registry according to an example of the present disclosure. Example system 400 may include a memory 430 storing a microservice registry 460. The microservice registry 460 includes references to microservices (e.g., 424 and 426), where reference to microservice 424 is a reference to a first microservice 414. In an example, isolated guest 440 executes on one or more processors 410, and the isolated guest 440 receives a request 455 to execute executable code 484. Isolated guest 440 determines that the executable code 484 is unavailable in the first isolated guest 440. In an example, isolated guest 440 may look for an executable code 484 in directories included in a $PATH variable. In an example, the $PATH variable may include a program to query a microservice registry 460 if a binary is unavailable in any directory listed in the $PATH variable. In an example, the isolated guest 440 may query the microservice registry 460 for a microservice that executes executable code 484. The isolated guest 440 may determine, based on the microservice registry 460, that the first microservice 414 executes the executable code 484. In an example, the isolated guest 440 may forward the request 455 to the first microservice 414, and receive a result 490 of the request 455 from the first microservice 414.

Figure 5:
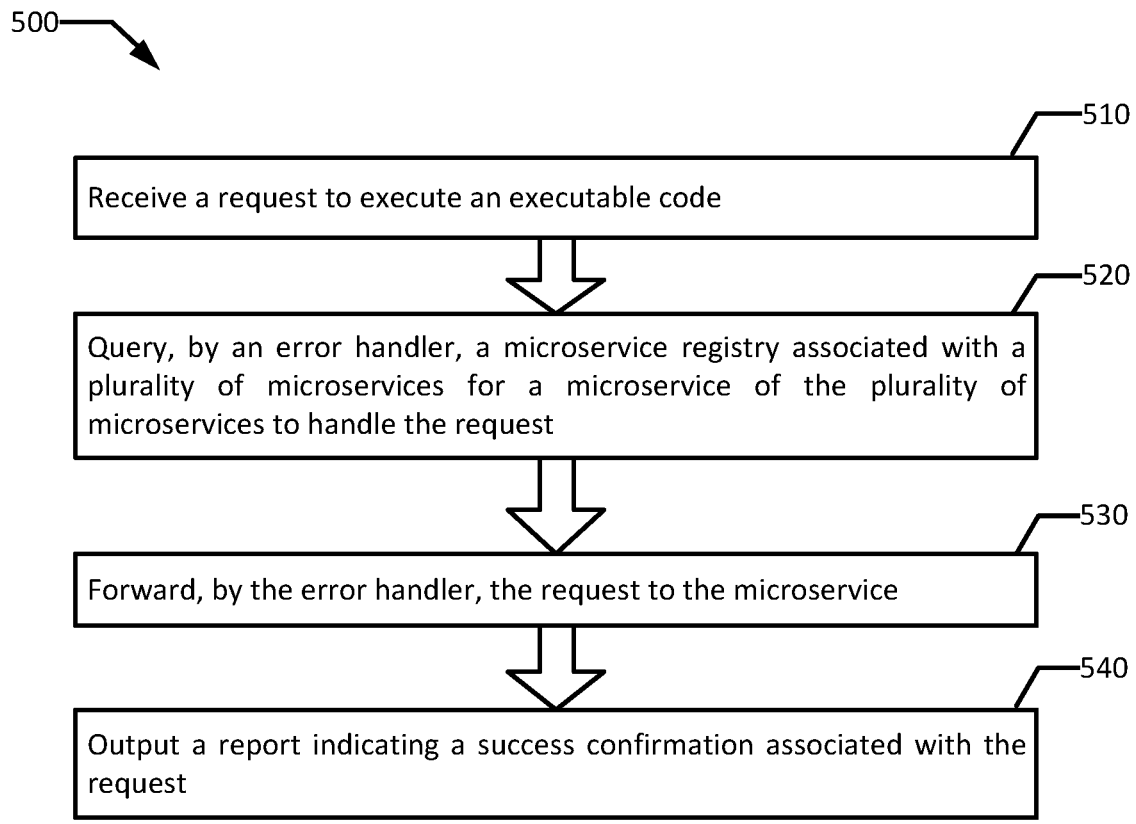
FIG. 5 is a flowchart illustrating an example of handling errors by executing code referenced from a microservice registry according to an example of the present disclosure.

FIG. 5 is a flowchart illustrating an example of handling errors by executing code referenced from a microservice registry according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method is performed by an operating system 147 that includes an error handler 149.

A request to execute an executable code is received by operating system 147 (block 510). In an example, a request is issued to operating system 147 (e.g., via command line or a graphical user interface of user node 145), the request including a command to execute at least one executable code (e.g., a binary executable file, an application, program, script, etc.). In the example, operating system 147 first attempts to fulfill the request with applications located inside a local file system of operating system 147. In an example, upon failing to locate an application in its local file system to handle the request, operating system 147 generates an error that triggers error handler 149 to attempt to fulfill the request. In an example, sending the request to error handler 149 may be part of a default cascade of steps taken by operating system 147 to fulfill the request before notifying a user of user node 145 that the request is unfulfillable. In an example, the request additionally specifies at least one data input that references data to be retrieved across network 105 from user node 145. In an example, error handler 149 may override the error generated by operating system 147 if error handler 149 and/or components identified by error handler 149 (e.g., microservices 116-119) are capable of handling the request. In an example, an error may also be generated where a request is prohibited from execution, for example, based on access controls associated with a data source for an input of the request. In an example such errors may also be trapped and handled by error handler 149.

An error handler queries a microservice registry associated with a plurality of microservices for a microservice of the plurality of microservices to handle the request (block 520). In an example, error handler 149 queries microservice registry 160 for at least one microservice to handle the request. In some examples, multiple microservices may be required to handle a given request, for example, where a result from executing a first application on an input becomes the input of a second application. In some examples, the full request, including input data from user node 145 may be sent to microservice registry 160, allowing microservice registry 160 to forward the request directly to identified microservices to execute the request. In other examples, microservice registry 160 may provide only index services and may instruct error handler 149 where to forward a given request (e.g., to microservice 116-119). In examples where multiple applications are required to handle a request, any combination of local execution by user node 145 and/or execution by microservices (e.g., microservices 116-119) may be implemented. For example, a request requiring two applications may be executed by microservice 116 and an application on operating system 147. The same request may also be executed, for example, by microservice 116 and microservice 118 (e.g., where application 188 is the application available on operating system 147). In an example, a seamless user experience is presented to a user of user node 145 regardless of whether a request is executed locally on user node 145 or in a microservice (e.g., microservices 116-119).

The error handler forwards the request to the microservice (block 530). In an example, microservice registry 160 identifies microservice 116 as being capable of handling at least part of the request, and error handler 149 forwards the request (or at least part of the request) to microservice 116. In an example, microservice 116 executes an application capable of retrieving remotely located data object 172 to execute the request. In an example, microservice 116 is selected over another microservice (e.g., microservice 117) to retrieve data object 172 based on a version of application 186 as compared to a version of application 187. In another example, microservice 116 is selected, for example, due to lower latency connecting to microservice 116 than microservice 117 (e.g., due to latency added to traverse a secure gateway of secure network 107). In another example, due to microservice 117 being located inside of secure network 107, microservice 117 is incapable of connecting to unsecured remote repository 170, and therefore microservice 116 is selected to retrieve data object 172.

In some examples, upon being queried, microservice registry 160 may identify that no currently executing guest supports executing the request, and/or no currently executing microservice (e.g., microservices 116-119) has computing capacity to execute the request. In such an example, microservice registry 160 may identify that an additional microservice may be instantiated to execute the request. Upon identification, microservice registry 160 may request a guest orchestrator (e.g., Kubernetes®, Red Hat® Openshift®) to instantiate a new container for a new microservice to execute the request. In an example, microservice registry 160 may notify operating system 147 that the request may be handled if a new guest is instantiated, and operating system 147 may request instantiation of the new guest, for example, with credentials associated with a user of guest node 145.

In an example, a microservice (e.g., microservice 116) may be implemented with multiple commonly associated programs combining to perform a common function. For example, a microservice may be implemented with a program to retrieve files in PDF format, and also a second program that converts the PDF format files to a modifiable format (e.g., a word processing or spreadsheet format). In such examples, a single microservice may perform multiple operations on a given input before returning results to operating system 147 and/or forwarding results to a downstream component (e.g., a second microservice). In some examples, these various functionalities may all be parts of a larger application program hosted on the microservice. In an example, microservice 116 may retrieve data object 172 and convert it into a format compatible with a data structure acceptable to microservice 118 (e.g., a relational database format). In an example, the output of microservice 116 is received by microservice 118 as an input to generate a report based on data mined from data object 172 by microservice 116. In an example, microservice 116 and microservice 118 may both host different component parts of a larger application program. In an example, one microservice may host multiple programs and/or applications. In an example, multiple microservices may be combined (e.g., in a cluster or Kubernetes® pod) to host the total functionality of a larger application program (e.g., with certain features hosted on each microservice). In an example, multiple copies of certain application components may be hosted on different microservices, for example, to allow for parallel processing of certain tasks.

In an example, the resulting report may be stored to persistent storage volume 122 on network storage node 120 instead of being transmitted directly back to user node 145. In the example, persistent storage volume 122 may be mounted to operating system 147 as a network drive to provide access to the data results. In such examples, persistent storage volume 122 may be utilized due to, for example, the size of the resulting report may exceed the storage capacity of user node 145 (e.g., where user node 145 is provisioned as a thin client with few computing resources). In another example, storing the resulting report in persistent storage volume 122 may provide enhanced data security in case of a loss or failure of user node 145. In an example, storing the report in persistent storage volume 122 may additionally provide data replication and version control features implemented in storage node 120 and/or persistent storage volume 122. Where confidential and/or sensitive data is involved, results may be further isolated by being stored behind a secure network (e.g., secure network 107) in a secure storage node 125 and secure persistent storage volume 127.

A report indicating a success confirmation associated with the request is outputted by the operating system (block 540). In an example, operating system 147 notifies the user of user node 145 or an application on user node 145 making the original request, that the request was successfully executed. In an example, a success message may be displayed in a graphical user interface. In another example, the results of executing the request may be displayed, whether or not such results are stored locally on user node 145. For example, results may be displayed from a mounted persistent storage volume 122, or through a viewing application (e.g., application 159) providing a portal through which data in a secure persistent storage volume 127 may be viewed. In an example, a report constructed by microservice 118 and application 188 may be modified by user node 145 (e.g., directly or through another microservice) and the results of the modifications may also be stored in persistent storage volume 122 and/or secure persistent storage volume 127.

Figure 6:
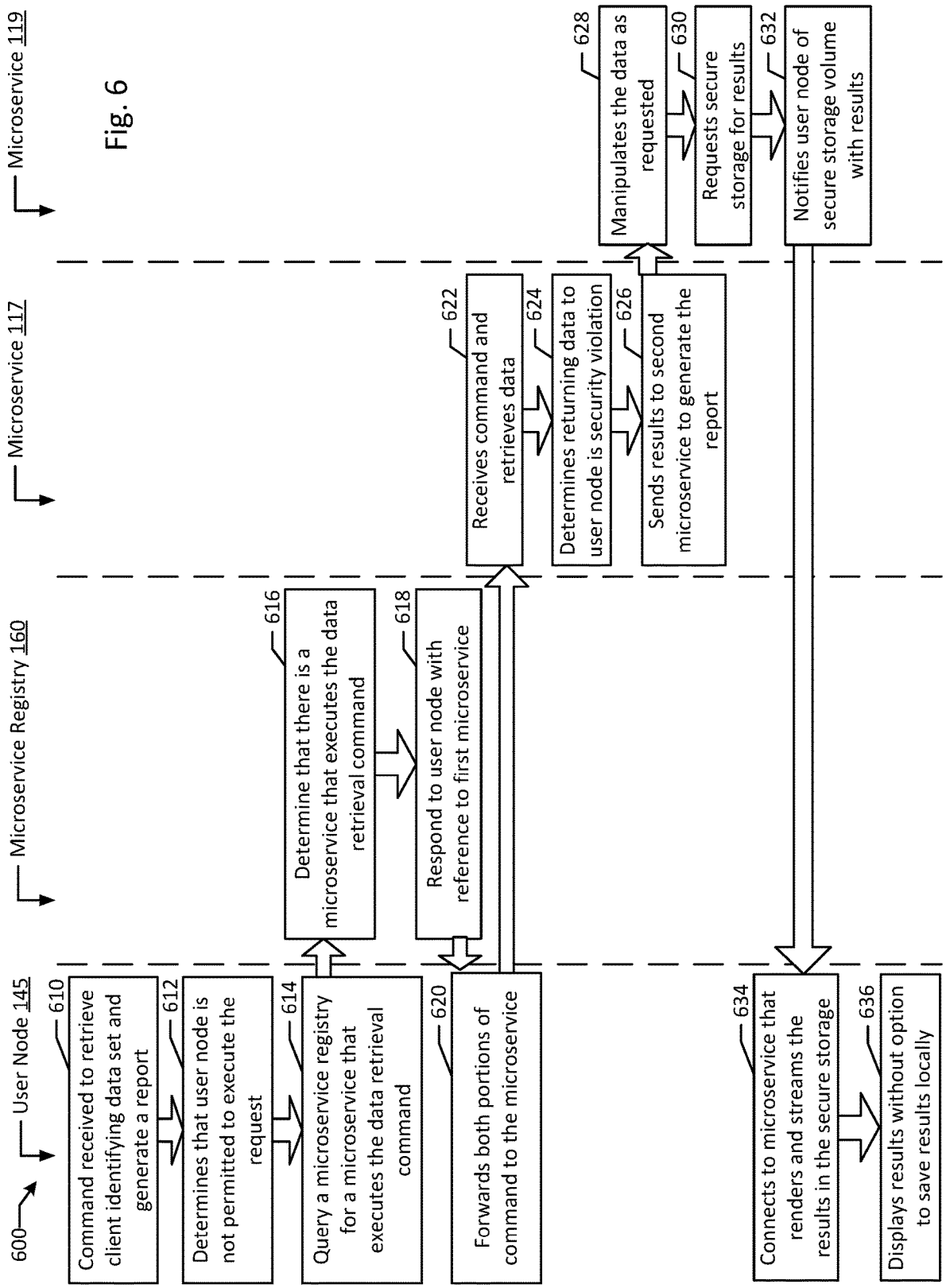
FIG. 6 is a flow diagram illustrating an example system handling an error by executing code referenced from a microservice registry according to an example of the present disclosure.

FIG. 6 is a flow diagram illustrating an example system handling an error by executing code referenced from a microservice registry according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, the isolated guest is a user node 145 executes a request via querying microservice registry 160 and processing the request via microservices 117 and 119.

In an example, user node 145 receives a command to retrieve a data set with client personal identifying information to generate a report (block 610). In the example, user node 145 (e.g., operating system 147) determines that user node 145 is not permitted to execute the request (block 612). For example, when user node 145 attempts to connect to secure repository 174 to retrieve data object 176 (e.g., the personal identifying information data set), an access restriction error is sent to user node 145 (e.g., indicating that the data object 176 may not be copied outside of secure network 107). In some examples, an error may also be generated based on user node 145 not having an appropriate application for accessing secure repository 174 installed. In an example, error handler 149 traps the error resulting from the failed attempt by operating system 147 to access data object 176. The error triggers error handler 149 to query microservice registry 160 for a microservice that is capable of executing the data retrieval portion of the request (e.g., microservice 117) (block 614). In an example, microservice registry 160 responds that microservice 117 executes the data retrieval command for data object 176 (block 616). Upon identifying microservice 117, microservice registry 160 responds to user node 145 with reference to microservice 117 and connection information for microservice 117, including a secure gateway for interfacing with secure network 107 (block 618). In some examples, error handler 149 may additionally query microservice registry 160 for a second microservice (e.g., microservice 119) that executes the report generation portion of the request. For example, based on the error indicating that data object 176 may not be copied outside of secure network 107, error handler 149 and/or microservice registry 160 identifies that an appropriate microservice 117 must be located inside of secure network 107. In an example, error handler 149, operating system 147, and/or microservice registry 160 may additionally recognize that results of manipulating data object 176 must remain within secure network 107, and therefore an additional microservice within secure network 107 that generates the requested report (e.g., microservice 119) needs to also be located (even if user node 145 would be capable of generating the report if data object 176 could be retrieved). In an example, error handler 149, operating system 147, and/or microservice registry 160 may additionally request a secure persistent storage volume to house the resulting report that is generated based on data object 176.

In an example, user node 145 forwards both the request to retrieve data object 176 and the commands for generating the requested report to microservice 117 (block 620). In the example, microservice 117 executes application 187 to retrieve data object 176 from secure repository 174 (block 622). In an example, microservice 117 determines that sending data object 176 to user node 145 would violate a data security policy for keeping client identifying information in secure storage (block 624). In the example, microservice 117 sends data object 176 directly to microservice 119 for report generation (block 626). For example, user node 145 may have included in its message to microservice 117 that microservice 119 had been previously identified as being capable of generating the requested report. In another example, microservice 117 may query microservice registry 160 for an appropriate microservice (e.g., microservice 119) to use to generate the report.

In an example, microservice 119 manipulates data object 176 to generate the requested report (block 628). In the example, microservice 119 also requests secure persistent storage volume 122 to be instantiated to store the resulting report (block 630). In other examples, secure persistent storage volume 122 may be preexisting and identified for use for storing the report by user node 145. In addition, secure persistent storage volume 122 may be separately requested for instantiation by user node 145, microservice registry 160, and/or microservice 117. In an example, microservice 119 notifies user node 145 that the resulting report is stored in secure persistent storage volume 122 (block 632). Based on the notification, user node 145 connects to microservice 157, which hosts application 159 (e.g., an application that renders securely stored information for viewing) to stream a view of the resulting report to user node 145. In an example, user node 145 is disabled from locally storing and/or saving information viewed through application 159 (block 636).

Figure 7:
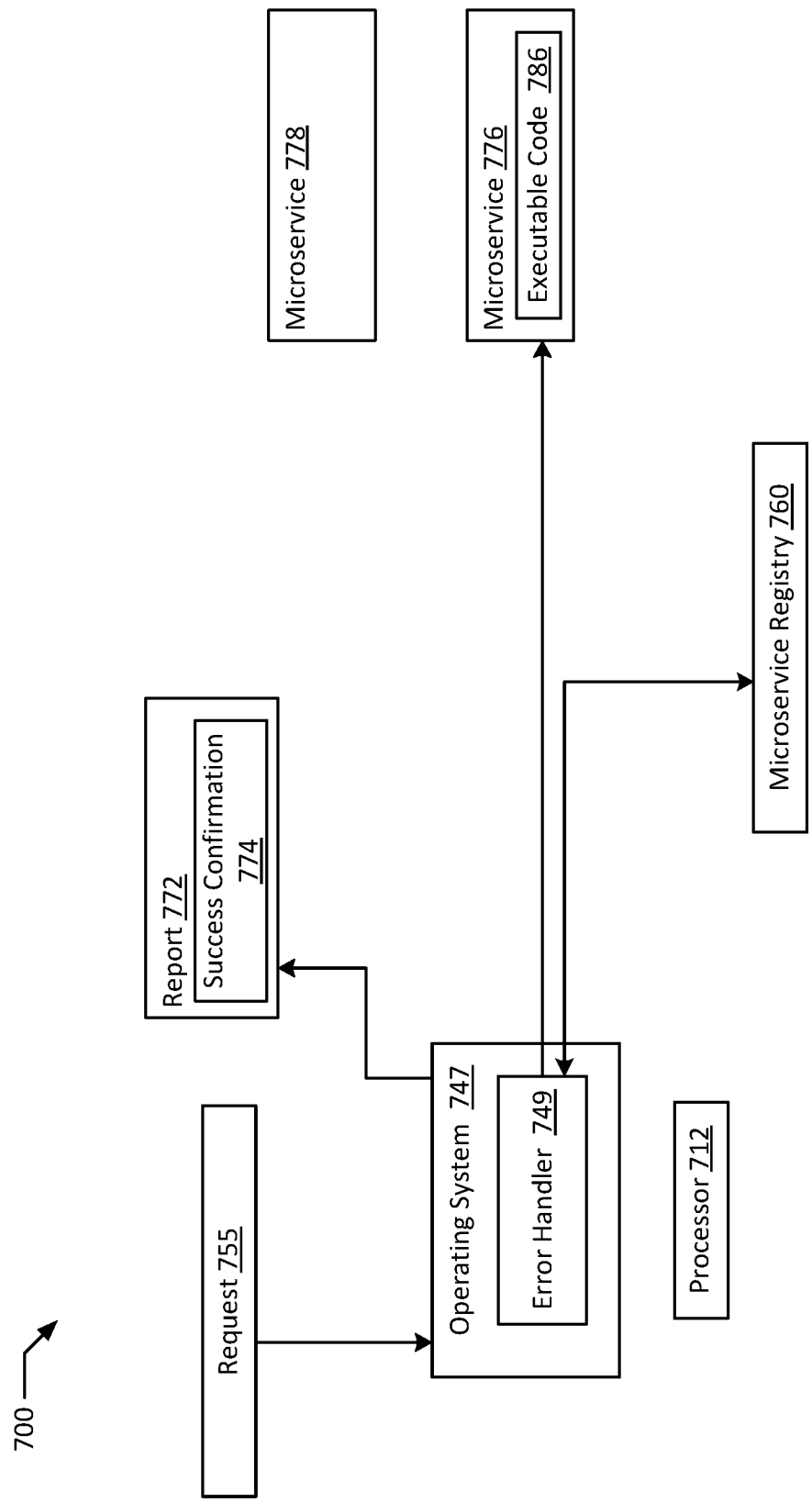
FIG. 7 is a block diagram of an example error handling system based on executing code referenced from a microservice registry according to an example of the present disclosure.

FIG. 7 is a block diagram of an example error handling system based on executing code referenced from a microservice registry according to an example of the present disclosure. Example system 700 includes microservice registry 760 associated with microservice 776 and microservice 778. Operating system 747 with error handler 749 executes on processor 712 to receive request 755 to execute executable code 786. Error handler 749 queries microservice registry 760 for a microservice (e.g., microservice 776) to handle request 755. Then error handler 749 forwards request 755 to microservice 776. Operating system 747 outputs report 772 indicating success confirmation 774 associated with request 755.

Executing code referenced from a microservice registry allows for both more efficient utilization of computer hardware, as well as more secure deployment of computing functionality. Inside a hosted computing environment, for example, a multi-tenant cloud, minimizing the components of a special purpose guest (e.g., a container hosting a web application) by removing components that are ordinarily unused by the special purpose guest reduces the size of the guest and therefore reduces startup latency for the guest while increasing guest density on a given physical host. In the rare situations where such guests require the rarely used components, a centralized microservice may handle the request at the cost of a latency penalty, but such latency penalty may only rarely be incurred while the latency benefits for guest startup may be realized several orders of magnitude more often. In addition, where a given application is required to execute server side, for example, due to data security concerns, microservice execution provides a highly secure execution platform for these sensitive computing tasks. Where data set size or processing complexity reach a certain threshold, microservice processing may actually also lead to a net processing latency gain, for example, where processing time reduction (e.g., due to more computing resources being available in a cloud environment than on a user device) exceeds network latency delays in transmitting data between a user device and the cloud environment. Therefore executing code referenced from a microservice registry advantageously results in higher hardware utilization rates while also improving data security and deployment flexibility.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a microservice registry associated with a plurality of microservices; and
an operating system with an error handler executing on one or more processors to:
receive, by the operating system which is on a host, a first request to execute a first executable code on the host, wherein the error handler executes on the host and is across a network from the microservice registry, and the first request is sent to the error handler based on the operating system determining that at least one of (i) the first executable code is unavailable on the host of the operating system in response to failing to locate the first executable code in a local file system, and (ii) executing the first request is prohibited on the operating system;
query, by the error handler, the microservice registry for a first microservice of the plurality of microservices to handle the first request;
forward, by the error handler, the first request to the first microservice; and
output, by the operating system, a report indicating a success confirmation associated with the first request.

2. The system of claim 1, wherein the error handler receives the first request based on the first request triggering an error associated with a failure to locate a command associated with the first executable code in the operating system.

3. The system of claim 2, wherein the error handler outputs an error indicating that a second executable code associated with a second request is unavailable in the operating system after querying the microservice registry for a second microservice capable of handling the second request.

4. The system of claim 1, wherein the first request includes a reference to data in a remote data repository.

5. The system of claim 4, wherein the first microservice retrieves the data in the remote data repository before executing the first executable code on the data.

6. The system of claim 4, wherein the first microservice forwards a result of executing the first executable code to a second microservice, the second microservice executes a second executable code on the result of executing the first executable code, and the second microservice outputs a final result of the first request.

7. The system of claim 6, wherein the final result is stored in a persistent storage volume, and connection information to the persistent storage volume is provided to the operating system.

8. The system of claim 7, wherein at least one of the persistent storage volume and the remote data repository is across a secure network from the operating system.

9. The system of claim 1, wherein a result of the first request is stored across a network from the operating system.

10. The system of claim 9, wherein updates to the result are also stored across the network from the operating system.

11. The system of claim 1, wherein the first request is forwarded to the first microservice instead of a second microservice capable of handling the first request based on at least one of a version of the first executable code available on the first microservice, a version of the first executable code available on the second microservice, a current response time of the first microservice, a current response time of the second microservice, a location of the first microservice, and a location of the second microservice.

12. The system of claim 1, wherein the first executable code is at least one of a binary executable file, a script, and a program.

13. The system of claim 1, wherein the first executable code was never installed on the host.

14. A method comprising:
receiving, by an operating system which is on a host, a first request to execute a first executable code on the host, wherein an error handler executes on the host and is across a network from a microservice registry, and the first request is sent to the error handler based on the operating system determining that at least one of (i) the first executable code is unavailable on the host of the operating system in response to failing to locate the first executable code in a local file system, and (ii) executing the first request is prohibited on the operating system;
querying, by the error handler, the microservice registry associated with a plurality of microservices for a first microservice of the plurality of microservices to handle the first request;
forwarding, by the error handler, the first request to the first microservice; and
outputting a report indicating a success confirmation associated with the first request.

15. The method of claim 14, wherein the error handler receives the first request based on the first request triggering an error associated with a failure to locate a command associated with the first executable code in the operating system.

16. The method of claim 14, wherein the first request includes a reference to data in a remote data repository, and the first microservice retrieves the data in the remote data repository before executing the first executable code on the data.

17. The method of claim 16, wherein the first microservice forwards a result of executing the first executable code to a second microservice, the second microservice executes a second executable code on the result of executing the first executable code, and the second microservice outputs a final result of the first request.

18. The method of claim 17, wherein the final result is stored in a persistent storage volume across a secure network from an operating system associated with the error handler, and connection information to the persistent storage volume is provided to the operating system.

19. The method of claim 14, wherein a result of the first request is stored across a network from the operating system, and updates to the result are also stored across the network from the operating system.

20. A computer-readable non-transitory storage medium storing executable instructions, which when executed by a computer system, cause the computer system to:
receive, by an operating system which is on a host, a first request to execute a first executable code on the host, wherein an error handler executes on the host and is across a network from a microservice registry, and the first request is sent to the error handler based on the operating system determining that at least one of (i) the first executable code is unavailable on the host of the operating system in response to failing to locate the first executable code in a local file system, and (ii) executing the first request is prohibited on the operating system;
query, by the error handler, the microservice registry associated with a plurality of microservices for a first microservice of the plurality of microservices to handle the first request;
forward, by the error handler, the first request to the first microservice; and
output a report indicating a success confirmation associated with the first request.

* * * * *